VARIABLE IMPEDANCE OUTPUT CIRCUIT

Filed Nov. 26, 1952 2 Sheets-Sheet 1

INVENTOR.
DANIEL L. CURTIS,
BY Robert H. Lentz
AGENT

VARIABLE IMPEDANCE OUTPUT CIRCUIT

Filed Nov. 26, 1952 2 Sheets-Sheet 2

DIGIT TIME INTERVALS

INVENTOR.
DANIEL L. CURTIS,
BY Robert H. Lentz
AGENT

United States Patent Office 2,775,714

Patented Dec. 25, 1956

2,775,714

VARIABLE IMPEDANCE OUTPUT CIRCUIT

Daniel L. Curtis, Venice, Calif., assignor, by mesne assignments, to Hughes Aircraft Company, a corporation of Delaware Application November 26, 1952, Serial No. 322,765

2 Claims. (Cl. 307—88.5)

This invention relates to a variable impedance output circuit and more particularly to an electronic variable impedance output circuit, responsive to the amplitude of an applied variable-voltage intelligence signal for preventing amplitude variations within a predetermined amplitude range from appearing in the output signal from the circuit.

In many electronic systems, variable voltage electrical signals are utilized for representing binary coded intelligence information. For example, in the digital computer art binary coded intelligence information is often stored in a magnetic memory by polarized magnetization of adjacent storage cells in the memory, the direction of the magnetization of each cell being determined by whether the binary value of 0 or 1 has been stored therein. This stored information is converted to a variable voltage signal by sequentially passing the storage cells under a reading head, the magnitude and polarity of the signal thus produced being a function of the rate of change in magnetic flux under the head as the storage cells are passed therebeneath.

Generally, the variable voltage signals produced in this manner vary about a reference level in accordance with the binary coded intelligence information represented. For example, the binary values of 0 and 1 usually are represented by positive and negative excursions, respectively, about the reference level. It will be recognized by those skilled in the art that the variable voltage signal may conform to either of two general types, depending upon whether return-to-zero recording or non-return-to-zero recording is utilized in the magnetic memory. Although the present invention may be utilized with either type of recording, it will be assumed for purposes of illustration that the variable voltage signal is produced in a non-return-to-zero magnetic memory. A detailed description of each of the above methods for recording in a magnetic memory may be found in U. S. Patent 2,540,654, entitled "Data Storage System" and issued Feb. 6, 1951, to A. A. Cohen et al.

Theoretically, the variable voltage output signal from a non-return-to-zero magnetic memory remains at a relatively constant reference potential whenever the binary value represented by the signal is unchanged during successive digit time intervals, and varies from the reference potential only when a change is indicated in the binary value represented by the signal. For purposes of illustration this type of variable voltage signal alone will be hereinafter referred to by the term variable voltage signal.

Assume, for example, that a variable voltage signal is to correspond to a series of binary digits which follow each other in successive digit time intervals. It will also be assumed that prior to the first digit time interval, the signal is at its reference level and corresponds to the binary value 1 and that the binary value to be represented during the first and second digit time intervals is 0. During the first digit time interval, therefore, the signal includes a negative pulse which lowers the signal voltage for at least a portion of the first digit interval. On the other hand, the binary value represented during the second digit time interval remains unchanged and, accordingly, the variable voltage signal remains substantially at its reference level. In a similar manner a change from the binary value 0 to the binary value 1 between successive digit time intervals is repersented by a positive pulse which raises the voltage of the signal above its reference level for at least a portion of a digit time interval.

It will be noted that in the above description of a variable voltage signal, as the term in herein utilized, it was assumed that the variable voltage signal remained substantially at its reference level when the binary value represented thereby, during any digit time interval, was the same as the value represented during the preceding digit time interval. In practice, however, electrical transients and stray magnetic fields often produce noise and other unwanted signal components which cause the variable voltage signal to vary erroneously. Generally, these erroneous or unwanted amplitude variations, although relatively large, are smaller than the intelligence modulated variations of the signal, or in other words, the voltage variations which indicate a change in the binary coded intelligence information represented by the signal. In utilizing the variable voltage signal, however, the unwanted signal components frequently falsely actuate electrical circuits and thereby introduce errors in the electrical system.

In the prior art, these undesirable amplitude variations necessitated the use of very carefully adjusted electronic clipping and clamping circuits in order to distinguish between desirable and undesirable signal variations. In addition, amplification of the variable voltage signals requires carefully designed linear amplifiers in order to prevent an even greater ratio of undesired signal components to desired signal components.

The present invention, on the other hand, provides a variable impedance output circuit which eliminates the above and other disadvantages of the prior art. According to the basic concept of this invention, the variable impedance output circuit is responsive to a variable voltage intelligence signal, including unwanted signal components, for producing an electrical output signal which varies about a reference level in accordance with only the desired or intelligence modulated voltage variations of the applied signal.

More particularly, the variable impedance output circuit of this invention is responsive to the applied variable voltage signal for presenting an impedance having a relativel low discrete value when the amplitude of the signal is within a predetermined range about its reference level, and an impedance having a relatively high discrete value when the amplitude of the signal is without or beyond the predetermined range. In its most general form, the variable impedance output circuit comprises a bridge network, including a plurality of unidirectional current devices, and an electrical biasing circuit connected thereacross to provide a predetermined forward current through each of the unidirectional current devices when the applied signal is at its reference potential.

In operation, the bridge network is utilized as an element of a voltage dividing circuit, the signal developed across the bridge being a function of the instantaneous impedance thereof. When the applied signal varies about its reference level within an amplitude range which is a function of the normal forward currents through the unidirectional current devices, the bridge network presents a relatively low impedance to the applied signal and the signal developed across the bridge network remains substantially clamped. On the other hand, when the amplitude of the applied sginal goes beyond the predetermined range, the impedance across the bridge network is raised to a relatively high value, and the signal developed across the bridge network varies in accordance with variations in the input signal.

It is, therefore, an object of this invention to provide a variable impedance output circuit for preventing unwanted signal components present in an applied variable voltage intelligence signal from appearing in a corresponding output signal from the circuit.

Another object of this invention is to provide a variable impedance circuit element responsive to an applied electrical input signal for presenting an impedance having a first discrete value when the amplitude of the signal is within a predetermined range, and an impedance having a second discrete value when the amplitude of the signal is without said range.

A further object of this invention is to provide a variable impedance output circuit for presenting first and second discrete impedance values to an applied variable voltage intelligence signal, including unwanted signal components, to prevent the unwanted components from appearing in the output signal from the output circuit.

Still another object of this invention is to provide a variable impedance output circuit responsive to the instantaneous amplitude of an applied variable voltage intelligence signal for presenting a relatively low discrete impedance to unwanted signal components in the intelligence signal and a relatively high discrete impedance to intelligence modulated voltage variations in the input signal.

A still further object of this invention is to provide a variable impedance output circuit responsive to an applied variable voltage signal which varies in amplitude about a reference level for presenting a relatively low discrete impedance to the signal when the signal is within a predetermined range about the reference level and a relatively high discrete impedance to the signal when the signal is without the predetermined range.

It is also an object of this invention to provide a variable impedance output circuit, responsive to an applied variable-voltage electrical input signal which varies in amplitude about a first reference level, for producing an electrical output signal which is clamped at a second reference level when the amplitude of the input signal is within a predetermined range about the first reference level, and which varies in accordance with variations in the input signal when the input signal is beyond the predetermined range.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and descrpition only, and are not intended as a definition of the limits of the invention.

Figures 1, 2:
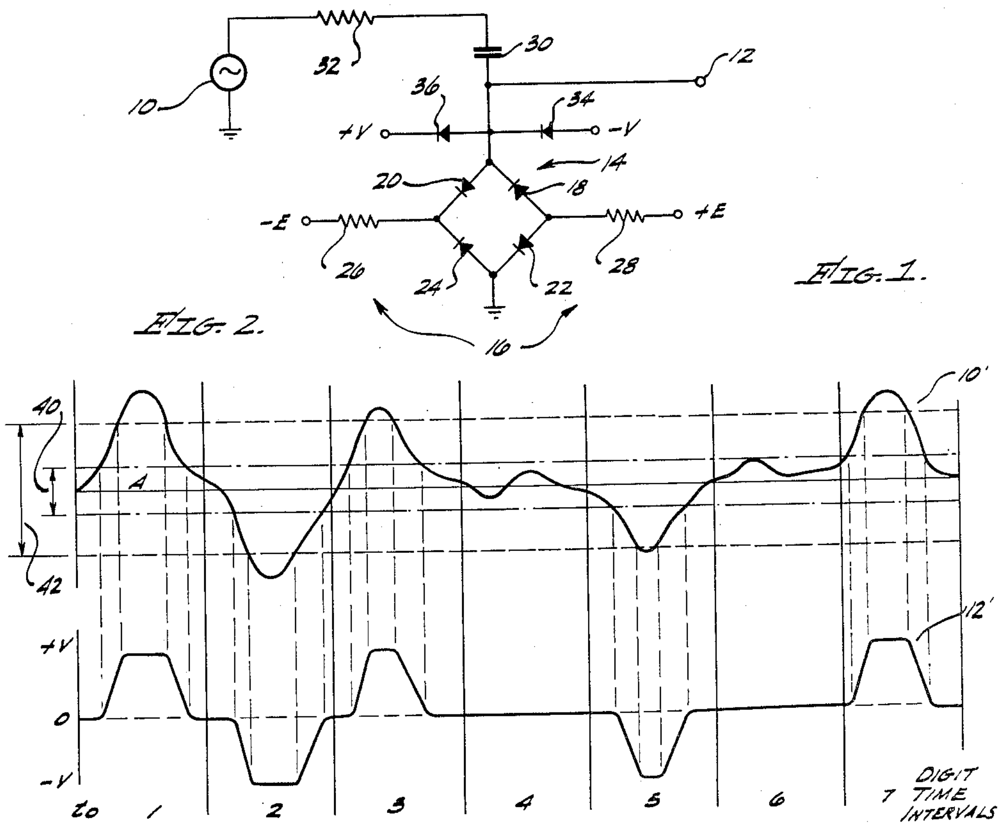
Fig. 1 is a schematic diagram of one embodiment of a variable impedance output circuit, according to the invention.
Fig. 2 is a composite diagram of the waveforms of electrical signals appearing at various points in the circuit of Fig. 1.

Referring now to the drawings, there is shown in Fig. 1 a variable impedance output circuit, according to the present invention, for preventing unwanted signal components present in a signal applied from a source 10 of variable-voltage signals from appearing in a corresponding output signal appearing at an output terminal 12. The variable impedance output circuit includes three basic elements, namely, a bridge network generally designated 14, a biasing circuit generally designated 16, and impedance means for coupling bridge network 14 to source 10.

Bridge network 14 comprises a first series circuit, including two unidirectional current devices, such as crystal diodes 18 and 20, respectively, and a second series circuit, including two unidirectional current devices, such as crystal diodes 22 and 24, respectively, connected in parallel with the first series circuit. As shown in Fig. 1, the cathodes of diodes 18 and 22 are connected to the anodes of diodes 20 and 24, respectively, and the anodes of diodes 18 and 22 are conected together while the cathodes of diodes 20 and 24 are connected together.

Biasing circuit 16 includes a resistor 26 interconnecting the junction of diodes 20 and 24 with one terminal —E of a source of negative biasing potential, not shown, and a resistor 28 interconnecting the junction of diodes 18 and 22 with one terminal +E of a source of positive biasing potential, not shown. Each of these sources of biasing potential also includes another terminal, not shown, which is grounded. In addition, the junction of diodes 22 and 24 is connected to a reference potential, such as ground, for example.

Intercoupling bridge network 14 and one output terminal of source 10 is a series circuit including a capacitor 30 having one end connected to the junction of diodes 18 and 20 and to output terminal 12, and another end connected to source 10 through a resistive element 32. A second output terminal of source 10 is connected to ground. As will be more clearly understood from the description which follows, variable voltage source 10 and resistive element 32 may be two distinct and separate electrical entities or may be the equivalent signal generator and internal impedance, respectively, of a single electrical circuit such as an electronic amplifier.

The variable impedance output circuit of Fig. 1 also includes a clipping circuit which comprises two additional unidirectional current devices, such as crystal diodes 34 and 36, respectively. The cathode of diode 34 and the anode of diode 36 are connected together and to the junction of diodes 18 and 20 of bridge network 14. The anode of diode 34 is connected to one terminal —V of a source of reference potential, not shown, while the cathode of diode 36 is connected to one terminal +V of a source of reference potential, not shown. Each of these sources of reference potential includes an additional terminal, not shown, which is grounded.

Referring now to Fig. 2, there is shown a composite diagram of typical waveforms of signals which appear at various points in the circuit of Fig. 1 and which are useful in describing the operation of the variable impedance output circuit of this invention. The signal, generally designated 10' in Fig. 2, which is applied to the variable impedance output circuit from variable voltage source 10, swings about a reference potential level A in accordance with coded intelligence information.

For purposes of illustration, it will be assumed that signal 10' corresponds to the binary coded intelligence output signal from a magnetic storage element and that the signal may be divided into a plurality of sections occurring during different digit time intervals as indicated by the time intervals designated 1 through 7. Signal 10' may then be interpreted as representing the binary value 1 in digit time intervals 1, 3, 4 and 7, and the binary value 0 in digit time intervals 2, 5 and 6. In other words, whenever a change occurs in the binary value represented by variable voltage signal 10', the signal swings to a relatively high or low value of voltage, the polarity of the swing indicating whether the change is from the binary value 0 to 1 or 1 to 0. If, on the other hand, the binary value represented by signal 10' is the same for two successive digit time intervals, such as intervals 3 and 4 when signal 10' corresponds to the binary value 1, signal 10' should not vary sufficiently to indicate a change in the binary value represented.

It will be noted, however, that when no change occurs in the binary value represented, such as during digit time intervals 4 and 6, for example, signal 10' does not remain at its reference potential level A, but instead varies appreciably about the reference level. In practice, these variations may be sufficiently large to indicate falsely a change in the binary value represented by the signal during a particular digit time interval, thereby introducing errors in the associated electrical circuits which utilize the intelligence information contained in the signal.

In addition, it will be noted that the amplitudes of the voltage swings of signal 10' vary during different time intervals when a change in the binary value is to be represented. For example, the maximum amplitude of signal 10' in digit interval 1 is larger than that in digit interval 3. Similarly, it will be recognized that the maximum swing of signal 10' during the second digit time interval is greater than the swing during the fifth digit time interval.

In order that signal 10' may be utilized properly for actuating associated electronic circuits, it is desirable to produce an output signal which varies above or below a predetermined reference voltage only when there is a change in the binary value represented by the signal. In addition, if the output signal is to be utilized for controlling electrical gating circuits, it may be desirable to limit the voltage swings of the output signal to certain predetermined values.

Referring again to Fig. 2, the unwanted amplitude variations or signal components of signal 10' are eliminated from the output signal of the circuit of Fig. 1 by electrically clamping the output signal at a substantially constant level when signal 10' is within the range designated 40. In addition, dissimilar amplitude variations in signal 10', when there is a change in the binary value represented, are prevented by electronically clipping the positive and negative peaks of the output signal when signal 10' swings beyond or without the amplitude range designated 42.

In order to properly describe the operation of the circuit of Fig. 1, it will be assumed for the moment that signal 10' is at its reference potential level A. It will be assumed further, for purposes of illustration, that resistors 26 and 28 are identical and that the absolute magnitudes of the potentials at terminals −E and +E are equal. A typical value for each of resistors 26 and 28 is of the order of 100,000 ohms or higher. Under these conditions, it is clear that all of the diodes in bridge circuit 14 will be front-biased and that an electrical current will flow from terminal +E to terminal −E, this current dividing equally through bridge network 14 to produce a substantially identical current through each of diodes 18, 20, 22 and 24.

It will be recognized that the output impedance of the circuit of Figure 1, or in other words, the impedance to ground from output terminal 12, will be substantially equal to the forward resistance of one diode. This may be shown mathematically by computing the resistance of two parallel-connected series circuits, each of which includes two forward biased diodes. Thus, if the forward impedance of each diode is 100 ohms, for example, the impedance from output terminal 12 to ground will also be 100 ohms. As will become apparent from the description which follows, the current which flows through each of diodes 18, 20, 22 and 24 determines the amplitude of voltage range 40 in Fig. 2, or in other words, the portion of input signal 10' which is eliminated from the corresponding output signal at output terminal 12.

It is clear that the voltage drop across each diode in bridge network 14 when input signal 10' is at its reference potential level A will be $$V_D = I_{DQ} R_{FB} \tag{1}$$

where $I_{DQ}$=the quiescent current through each diode; and
$R_{FB}$=forward resistance of each diode.

It is also clear that the potential at output terminal 12 under these quiescent conditions will be substantially at ground, since the output signal is equal to $$E_{out} = V_{D22} - V_{D18} = V_{D20} - V_{D24} = R_{FB}(I_{D22} - I_{D18}) = R_{FB}(I_{D20} - I_{D24}) \tag{2}$$

and since $I_{D18} = I_{D20} = I_{D22} = I_{D24} = I_{DQ}$ $$E_{out} = O$$

Assume now that at time $t_0$ input signal 10' starts to swing to a relatively high voltage, thereby indicating a change in the binary value represented by the signal. During the time when signal 10' is swinging between reference potential level A and the upper end of voltage range 40, resistive element 32 and bridge network 14 coact as a voltage divider. Accordingly, the potential at output terminal 12 may be shown to be substantially equal to $$E_{out} = \frac{E_{in} R_{FB}}{R_{FB} + R_{32}}$$

where $E_{in}$=amplitude of input signal 10' beyond reference potential level A
$R_{32}$=impedance of resistive element 32; and
$R_{FB}$=the equivalent resistance of bridge 14, or the forward impedance of one diode.

If the value of $R_{32}$ is assumed to be of the order of 10,000 ohms, substitution in Equation 3 produces the relationship $$E_{out} = \frac{E_{in} \times 100}{10{,}000 + 100} = \frac{E_{in}}{101} \tag{4}$$

It is clear, therefore, that the potential at output terminal 12 varies relatively little or, in other words, is substantially clamped when signal 10' is varying within range 40.

Consider now the electrical currents through the diodes in bridge network 14 when signal 10' varies between its reference potential level A and the upper end of voltage range 40. As signal 10' increases in magnitude, the output signal appearing at output terminal 12 does increase slightly in magnitude in accordance with Equation 4. This relatively small rise in the output signal is accompanied by an increase in the current through diodes 20 and 22 and a complementary decrease in the currents through diodes 18 and 24.

At the instant when signal 10' reaches the upper limit of range 40, it may be seen by nodal analysis that the current through diodes 18 and 24 is substantially zero, while the current through each of diodes 20 and 22 has substantially doubled with respect to the quiescent current which flowed therethrough when signal 10' was at its reference level. Accordingly, the potential at output terminal 12 may be found from Equation 2 to be $$E_{out} = R_{FB}(I_{D20}) = R_{FB}(I_{D22}) = R_{FB}(2I_{DQ}) \tag{5}$$

Accordingly, the relationship between the magnitude of signal 10' at the extremities of voltage range 40 ($E_{in}$ critical), and the quiescent current $I_{DQ}$ may be found by substituting Equation 5 in Equation 3. Thus $$\frac{E_{in}\text{ (critical) } R_{FB}}{R_{FB} + R_{32}} = R_{FB}(2I_{DQ})$$

or $$E_{in}\ (\text{critical})=2I_{DQ}(R_{FB}+R_{32}) \quad (6)$$

where $E_{in}$ (critical)=the magnitude of signal 10' at the extremities of range 40. It is clear from Equation 6 that the limit of range 40 may be varied as desired by varying the quiescent current through the diodes in the bridge circuit, or in other words, by varying the parameters of biasing network 16.

Consider now the operation of the variable impedance output circuit of this invention when signal 10' goes beyond the upper limit of range 40. As signal 10' increases beyond the point at which diodes 18 and 24 cease current conduction in the forward direction, or in other words, above the critical value set forth in Equation 6, diodes 18 and 24 become back biased. Neglecting the effect of impedances 26 and 28 and the back impedances of diodes 34 and 36, it may be shown that the voltage dividing action of bridge network 14 and resistive element 32 now produces an output signal which is related to the portion of the applied signal without range 40 by the following approximation:

$$E_{out}\simeq\frac{E_{in}R_{RB}}{R_{RB}+2R_{32}} \quad (7)$$

where $R_{RB}$=the back impedance of one diode. Assuming that $R_{RB}$ is of the order of 500,000 ohms, and recalling that $R_{32}$ was assumed to be 10,000 ohms, the expression for $E_{out}$ becomes $$E_{out}\simeq\frac{500E_{in}}{520}\simeq E_{in} \quad (8)$$

It is clear, therefore, that when signal 10' is within range 40, the variable impedance network of this invention presents a relatively low discrete impedance to the input signal in order to clamp the output at a relatively fixed potential, whereas a relatively high discrete value of impedance is presented to signal 10' when it is beyond range 40, thereby producing an output signal which is substantially identical to the input signal.

Referring again to Fig. 2, the waveform of the output signal appearing at output terminal 12 is shown by the signal generally designated 12'. It will be noted that signal 12' is clamped at substantially zero volts whenever signal 10' is within range 40. It will be recognized, of course, that when signal 10' falls below the lower end of voltage range 40, diodes 20 and 22 in bridge network 14 are back-biased while diodes 18 and 24 conduct more heavily. It will also be recognized by those skilled in the art that the zero reference potential of signal 12' is established by the ground connection to the junction of diodes 22 and 24.

In addition, as shown in Fig. 2, the upper and lower excursions of signal 12' are clamped at +V volts and −V volts, respectively. This is accomplished by clipping with diodes 36 and 34 the positive and negative portions, respectively, of signal 10' which go beyond voltage range 42. When the instantaneous value of signal 12' is less than the potential +V and greater than the potential −V, diodes 34 and 36 are both back biased. However, when input signal 10' swings sufficiently high to raise the magnitude of signal 12' to +V volts, diode 36 becomes front biased and prevents any further increase in the magnitude of signal 12'. Similarly, when signal 10' swings sufficiently low to lower the magnitude of signal 12' to −V volts, diode 34 is front biased and thereby prevents any further increase in the negative excursion of signal 12'. It is clear, of course, that the extent of voltage range 42, or in other words, that range beyond which the peaks of signal 10' are clipped, may be varied as desired by changing the values of the potentials applied at terminals −V and +V.

It is thus seen that signal 12' varies from its reference potential level only when the signal contains desired intelligence information. Accordingly, associated circuits to which the output signal is applied cannot be falsely actuated by the unwanted signal components present in input signal 10'. In addition, since the positive and negative peaks of signal 12' are held substantially constant, the signal may be utilized directly for controlling electrical gating circuits.

It will be immediately apparent to those skilled in the art that various modifications may be made in the circuit of Fig. 1 without departing from the spirit of this invention. For example, capacitor 30, which in the above description is utilized as an alternating current coupling capacitor, may be eliminated if the reference level A of signal 10' is equal to that of the reference potential applied to the junction of diodes 22 and 24. On the other hand, if it is assumed that reference level A is different from that of the potential applied to the junction of diodes 22 and 24, output terminal 12 may be connected to the junction of capacitor 30 and resistive element 32 in order to provide an output signal which conforms substantially to the waveform of signal 12' but which varies about a reference potential level A instead of ground potential as shown in Fig. 2.

It will also be recognized that the reference potential of the output signal for the variable impedance output circuit shown in Fig. 1 may be changed by merely changing the reference potential connected to the junction of diodes 22 and 24. In addition, the description set forth above assumes that voltage range 40 in Fig. 2 is symmetrical about reference level A. This symmetry was achieved by setting the parameters of biasing circuit 16 so that the quiescent current through each of diodes 18, 20, 22 and 24 was equal.

Assume now, however, that the value of impedance element 28 is lowered. Under these conditions, when signal 10' is at its reference level A, the quiescent current through diode 22 will be larger than the quiescent current through diode 18. The quiescent current through diode 20, on the other hand, will obviously be the same as that flowing through diode 18, while the current flowing through diode 24 will be less than that flowing through diodes 18 and 20. Therefore, when signal 10' swings positive, diode 24 will be back biased by a lower input signal magnitude than is required to back bias diode 18. Since the output signal appearing at output terminal 12 will not vary in accordance with Equation 8 until both diodes 18 and 24 are back biased, it is clear that the quiescent current which flows through diode 18 is the parameter which controls the magnitude of the upper limit of voltage range 40. By similar reasoning, it may be shown that when signal 40 swings negative, the input signal magnitude whereat the effective impedance of bridge network 14 changes to its high value will be determined by the quiescent current flowing through diode 22. Accordingly, it will be recognized that inasmuch as the quiescent current through diode 22 is larger than the quiescent current through diode 18, the input signal voltage range through which no appreciable output signal is produced will be asymmetrical about reference level A. In other words, the magnitude of the positive input signal necessary to change the impedance of bridge 14 to its relatively high discrete value will be less than that of the required negative signal. It should be immediately apparent, of course, that although it was assumed in this instance that the value of impedance element 28 was varied, the same effect may be achieved by varying the value of impedance element 26 or the potential applied at either or both of terminals −E and +E.

The variable impedance output circuit of this invention may also be utilized for producing two electrical output signals corresponding to the positive and negative excursions, respectively, of the applied input signal. In addition, each of the two output signals may be employed to gate a periodically recurring electrical clock pulse signal to present a pair of electrical clock pulse output signals corresponding to the intelligence modulated positive and negative excursions of the applied signal.

Figure 3:
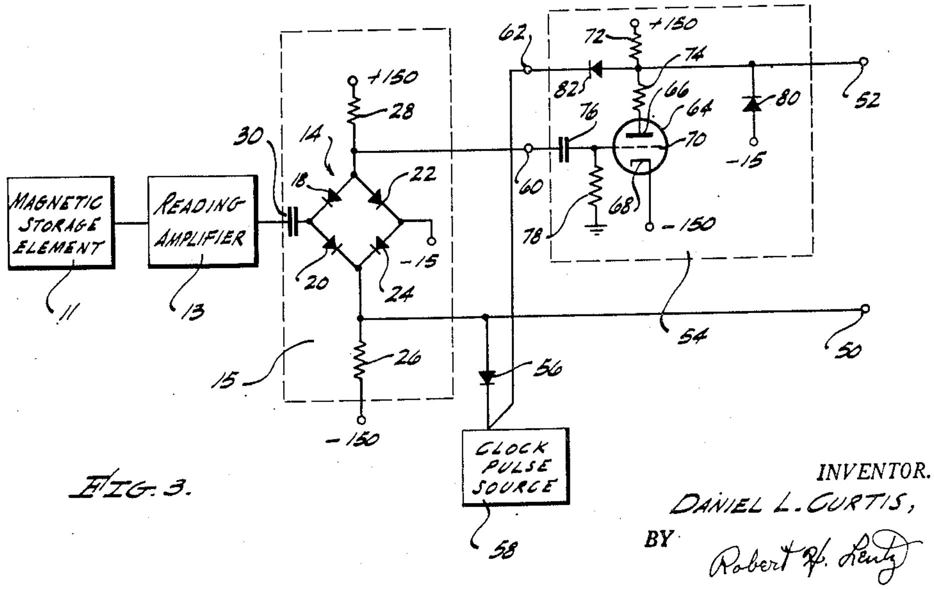
Fig. 3 is a schematic diagram of a combined electronic amplifying and gating circuit utilizing the variable impedance output circuit of this invention.

Referring now to Fig. 3, there is shown a typical electrical circuit in which the variable impedance output circuit is utilized. This circuit includes a magnetic storage element 11 for producing a variable voltage intelligence signal corresponding to binary coded intelligence information stored therein, a reading amplifier 13 for amplifying the intelligence signal, and a variable impedance output circuit 15, according to this invention, for eliminating unwanted signal components present in the intelligence signal. In addition, the circuit of Fig. 3 includes associated electronic gating circuits which are connected to bridge network 14 for producing at two output terminals 50 and 52, respectively, two electrical clock pulse output signals, corresponding to positive and negative intelligence modulated excursions, respectively, of the applied variable-voltage signal.

Magnetic storage element 11 may, for example, include a rotatable magnetic drum and an associated reading head for producing a variable voltage intelligence signal corresponding to intelligence stored in a track on the magnetic drum. The intelligence signal is applied to the input circuit of reading amplifier 13 which may, for example, be a conventional triode amplifier. Variable impedance output circuit 15, in turn, is connected as a load for amplifier 13. It will be noted by comparison with the circuit of Fig. 1 that impedance element 32 of Fig. 1 is replaced in Fig. 3 by the internal impedance of amplifier 13.

The structure and components of variable impedance output circuit 15 correspond to those shown in Fig. 1 and are designated by corresponding reference characters. However, in order to set forth the operation of the circuit of Fig. 3 most clearly, typical values have been assigned to the biasing potentials of biasing circuit 16. Thus, potentials of +150 volts and −150 volts are applied to one end of resistors 28 and 26, respectively, from a source of potential, not shown, while a potential of −15 volts is applied to the junction of diodes 22 and 24 from a source of potential, not shown.

It will be recognized that the variable impedance output circuit shown in Fig. 3 is arranged to produce two output signals, instead of one composite output signal as shown and described for Fig. 1. Thus in Fig. 3 the junction of resistor 26 and bridge network 14 is connected to output terminal 50, while the junction of resistor 28 and bridge network 14 is coupled to output terminal 52 by an inverting circuit 54. Output terminal 50 is also connected to the anode of a unidirectional current device, such as crystal diode 56, the cathode of diode 56 being connected to one output terminal, not shown, of a source 58 of periodically recurring clock pulses.

Inverting circuit 54 includes two input terminals 60 and 62 connected to the junction of bridge network 14 and resistor 28, and to the output terminal of clock pulse source 58, respectively. In the specific circuit shown in Fig. 3, inverting circuit 54 also includes a vacuum tube triode 64 having an anode 66, a cathode 68 and a grid 70. Anode 66 is connected to the +150 volt source through two serially connected resistors 72 and 74, respectively, while cathode 68 is connected directly to the −150 volt source. Grid 70, on the other hand, is coupled to input terminal 60 by a capacitor 76 and to ground by a resistor 78.

The junction of resistors 72 and 74 in the inverting circuit is connected to output terminal 52, to the cathode of a clamping diode 80 and to the anode of a gating diode 82. The anode of clamping diode 80 is, in turn, connected to the −15 volt potential source, not shown, while the cathode of diode 82 is connected to input terminal 62.

The operation of the circuit shown in Fig. 3 will be described with reference to Fig. 4 which illustrates typical waveforms of the electrical signals appearing at various points in the circuit of Fig. 3. It will be assumed for purposes of illustration that the variable voltage signal applied to amplifier 13 from magnetic storage element 11 is identical to variable voltage signal 10′ in Fig. 2, this signal being illustrated in Fig. 4 by the waveform generally designated 11′. In addition, it will be assumed that the value of resistors 26 and 28 in biasing circuit have been selected to provide different quiescent currents through diodes 22 and 24 of bridge network 14 in order to clamp the output signal from amplifier 13 when signal 11′ is within the voltage range 70 in Fig. 3. By making the quiescent current through diode 22 larger than the current through diode 24, voltage range 70 is made asymmetrical about the reference potential of signal 11′, as shown in Fig. 4.

Figures 4, 6:
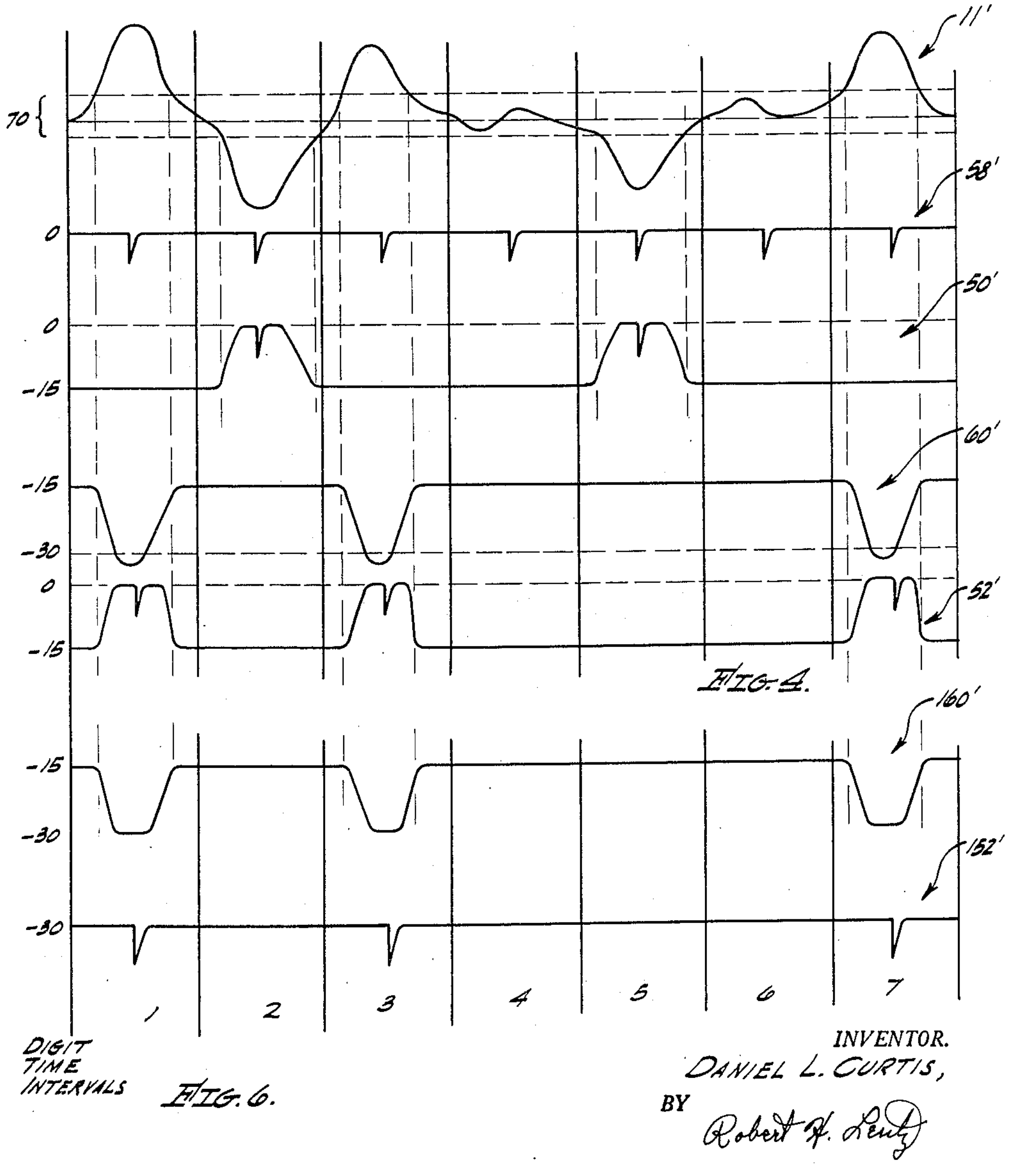
Fig. 4 is a composite diagram of the waveforms of electrical signals appearing at various points in the circuit of Fig. 3.
Fig. 6 is a composite diagram of the waveforms of electrical signals appearing at various points in the circuit of Fig. 5 when this circuit is substituted for the gating circuit in Fig. 3.

In operation clock pulse source 58 applies a periodically recurring clock pulse signal, generally designated 58′ in Fig. 4, to the anode of diode 56 and the cathode of diode 82. It will be assumed that signal 58′ has a steady-state potential level of ground potential, and includes negative clock pulses which occur in the middle of each digit time interval. The maximum magnitude of these pulses, as will be more clearly understood from the description below, is limited to 15 volts.

When signal 11′ is applied to amplifier 13, the transconductance of the amplifier varies in accordance with the amplitude of the applied signal, and signal inversion occurs in the conventional manner. However, because of the previously described clamping action of bridge network 14, the potentials at the junctions of bridge network 14 with capacitor 30, resistor 26 and resistor 28 remain substantially constant when signal 11′ is within voltage range 70.

Consider now the behavior of variable impedance output circuit 15 when signal 11′ goes beyond the limits of voltage range 70. When the signal goes above the upper limit of range 70 diodes 20 and 22 are back-biased, thereby changing the effective load impedance of bridge network 14 to a relatively high discrete value. Accordingly, the signal appearing at the junction of capacitor 30 and bridge network 14 will decrease substantially in accordance with the increase in signal 11′ due to the signal inversion by amplifier 13. It is clear that under this condition the signal generally designated 50′ in Fig. 4, which appears at output terminal 50, will remain substantially at −15 volts, since diode 20 is back biased whereas diode 24 is front biased. On the other hand, the signal generally designated 60′ in Fig. 4, which is applied to input terminal 60 of inverting circuit 54, will vary in accordance with the variation in potential at the junction of capacitor 30 and bridge network 14, since diode 18 is front biased whereas diode 22 is back biased. In addition, since no provision is made in the circuit of Fig. 3 for clipping the peaks of signal 60′, the entire portion of signal 11′ which is above the upper limit of voltage range 70 appears as a corresponding negative excursion in signal 60′.

Assume now that signal 11′ goes below the lower limit of voltage range 70, as shown during the second and fifth digit time intervals. In these instances diodes 18 and 24 are back biased in the manner described in connection with Fig. 1. It is clear that signal 60′ will now remain substantially constant at −15 volts since diode 22 is front biased and diode 18 is back biased. On the other hand, signal 50′ will now increase in potential in accordance with the decrease in potential of signal 11′. It will be noted, however, that when signal 50′ has been driven to ground potential by the decrease in signal 11′, diode 56, which heretofore has been back biased, is rendered conductive and thereby substantially prevents any further increase in the magnitude of signal 50′. In addition, when negative clock pulse 51 of signal 58′ occurs in the middle of the second digit time interval, the magnitude of signal 50′ is lowered accordingly and includes a corresponding clock pulse 53. Thus it may be seen that each time signal 11′ goes below the lower limit of voltage range 70, as indicated during the second and fifth digit time intervals, signal 50′ presents a negative clock pulse signal at output terminal 50.

Consider now the response of inverting circuit 54 to the application of signal 60′. When the signal is at its normal or quiescent value of −15 volts, the signal generally designated 52′ in Fig. 4, which appears at output terminal 52, is clamped at −15 volts by diode 80. However, when signal 60′ goes negative during the first, third and seventh digit time intervals, triode 64 is driven toward cutoff and the potential at output terminal 52 is increased, or in other words, an inverted output signal is produced corresponding to applied signal 60′. As signal 60′ approaches its negative peaks, signal 52′ rises to ground potential and is thereafter prevented from rising further by diode 82 which becomes front biased and clamps signal 52′ at the steady-state potential of clock pulse signal 58′. It will be recognized, therefore, that clock pulses occurring in signal 58′ when signal 50′ is at its high level value, such as during digit time intervals 1, 3 and 7, will be passed by diode 82 and produce corresponding clock pulses in output signal 52′.

In view of the foregoing description of the circuit of Fig. 3, and more particularly the description of the variable impedance output circuit of this invention, it is clear that the unwanted signal components present in variable voltage signal 11′ are prevented from producing an output signal containing erroneous intelligence information. In addition, it has been shown how the variable impedance output circuit of this invention may be utilized to produce two output signals corresponding to the positive and negative intelligence-modulated variations, respectively, in the applied variable voltage signal.

It should be understood, of course, that the electrical circuit of Fig. 3 is merely illustrative, and is not intended to limit the application of the variable impedance output crcuit of this inventon. For example, the same function may be performed by replacing inverting circuit 54 with a diode gating circuit.

Figure 5:
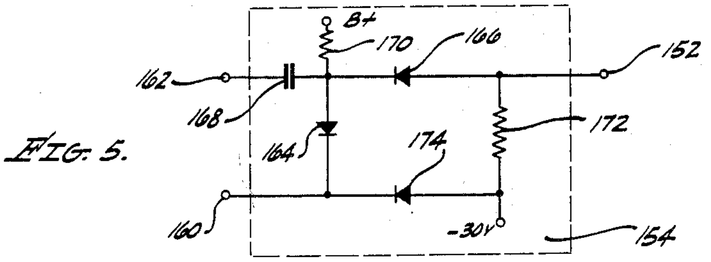
Fig. 5 is a schematic diagram of a passive element gating circuit which may be substituted for a portion of the electrical gating circuit shown in Fig. 3.

Referring now to Fig. 5, there is shown a gating circuit 154 which may be utilized to replace inverting circuit 54 in the circuit of Fig. 3. Gating circuit 154 is the subject of copending U. S. patent application, S. N. 276,254, entitled "Diode Gating Circuits" by A. Scarborough and E. Bolles, and includes two input terminals 160 and 162 corresponding to input terminals 60 and 62, respectively, in Fig. 3, and an output terminal 152 corresponding to output terminal 52 in Fig. 3. Connected between terminals 160 and 152 is a unidirectional current path including a pair of unidirectional current devices, such as crystal diodes 164 and 166, diode 164 having its cathode connected to input terminal 160 and diode 166 having its anode connected to output terminal 152.

The common junction diodes 164 and 166 is coupled to input terminal 162 through a capacitor 168 and to one terminal B+ of a source of biasing potential, not shown, through a resistor 170. The source of biasing potential includes another terminal, not shown, which is grounded. Output terminal 152 is also connected through an output load resistor 172 to a −30 volt source of potential, not shown. In addition, gating circuit 154 includes another unidirectional current device, such as crystal diode 174, for interconnecting input terminal 160 and the −30 volt source.

The operation of the circuit shown in Fig. 3 when inverting circuit 54 is replaced with gating circuit 154 is similar in most respects to the operation previously described. For example, the signal appearing at output terminal 50 and the manner in which the signal is developed are identical to those previously described. In addition, the signal appearing at input terminal 160 is similar to signal 60′ in Fig. 4 with the exception that the negative portion of signal 60′ which falls below −30 volts is clipped by diode 174 in gating circuit 154. The signal appearing at input terminal 160 is shown by the waveform generally designated 160′ in Fig. 6.

When signal 160′ is at its relatively high level of −15 volts, diode 164 clamps the cathode of diode 166 at substantially the same potential thereby back biasing diode 166. Accordingly, clock pulses applied to input terminal 162 are inhibited from appearing at output terminal 152.

On the other hand, when signal 160′ is at its low level value of −30 volts during the first, third and seventh digit time intervals, diode 164 clamps the cathode of diode 166 at substantially −30 volts. When clock pulses are applied from clock pulse source 58 in the middle of each of these digit time intervals, diode 166 is front-biased and presents a corresponding clock pulse in the output signal, generally designated 152′ in Fig. 6, which appears at output terminal 152.

It should be understood, of course, that the variable impedance output circuit may be employed with other types of electronic gating circuits which utilize multigrid vacuum tubes, for example. It should be clear, therefore, that the foregoing disclosure relates to only preferred embodiments of the invention and that numerous modifications may be made therein without departing from the spirt and scope of the invention as set forth in the appended claims.

What is claimed as new is:

1. A variable impedance circuit for producing an output signal which is clamped within a first given range above and below a predetermined reference level in response to an applied variable amplitude alternating current signal which varies about said reference level, and which prohibits production of an output signal during the time said input signal is within a second given range above and below said reference level, said second range being smaller than said first range, said variable impedance circuit comprising: a first series circuit including two crystal diodes having a first common junction; a second series circuit including two crystal diodes having a second common junction, said series circuits being connected in parallel; a source of variable amplitude alternating-current signals; a resistor and capacitor connected in series between said signal source and said first common junction for applying said alternating-current signal to said first and second series circuits, said second common junction being connected to a point of fixed potential; first and second clamping means connected to said first common junction to clamp the output signals within said first range above and below said reference level; and first and second independent biasing circuits, each including a resistive impedance element, said first biasing circuit being connected to one end of said series circuits, said second biasing circuit being connected to the other end of said series circuits for applying a fixed biasing potential thereacross to produce a predetermined forward current flow through each of said series circuits which is sufficient to substantially saturate each of said crystal diodes during the time the input signal is within said second range, whereby said series circuits present a negligible impedance to said input signal during the time it is within said second range above and below said reference level and no output signal is produced thereby and whereby said series circuits present a high impedance to said input signal during the time it is without said second range and an output signal is produced thereby.

2. A variable impedance circuit for producing an output signal which is clamped within a first given range above and below a predetermined reference level in response to an applied variable amplitude alternating-current signal which varies about said reference level, and which prohibits production of an output signal during the time said input signal is within a second given range above and below said reference level, said second range being smaller than said first range, said variable impedance circuit comprising: first, second, third, and fourth crystal diodes, each including an anode and a cathode, the cathodes of said first and second diodes being interconnected, the anodes of said third and fourth diodes being interconnected, the anode of said first diode and the cathode of said third diode being interconnected at a first common junction, the anode of said second diode and the cathode of said fourth diode being interconnected at a second common junction, said second common junction being connected to a point of fixed potential; a source of variable amplitude alternating-current signals; a resistor and a capacitor connected in series between said signal source and said first common junction for applying said alternating-current signal to said diodes; first and second clamping means, each including a diode and a source of clamping potential connected to said first common junction point, the diode within said first clamping means being poled to clamp said output signal within said first range above said predetermined reference level and the diode within said second biasing means being poled to clamp said output signal within said first range below said reference level; and first and second independent biasing circuits, each including a resistor and a source of biasing potential, said first biasing circuit being connected to the anodes of said third and fourth diodes, said second biasing circuit being connected to the cathodes of said first and second diodes for applying a fixed biasing potential across said diodes to produce a predetermined forward current flow which is sufficient to saturate each of said diodes, whereby said diodes present a negligible impedance to said input signal during the time it is within said second range above and below said reference level and no output signal is produced thereby, and whereby said second and third diodes present a high impedance to said input signal during the time it is above the upper level of said second range and said first and fourth diodes present a high impedance to said input signal when it is below the lower level of said second range and an output signal is produced thereby.

References Cited in the file of this patent

UNITED STATES PATENTS

| | | |
|---|---|---|
| 1,200,796 | Arnold | Oct. 10, 1916 |
| 2,248,793 | Terry | July 8, 1941 |
| 2,286,450 | White et al. | June 16, 1942 |
| 2,341,336 | Singer | Feb. 8, 1944 |
| 2,438,948 | Riesz | Apr. 6, 1948 |
| 2,511,468 | Harrison | June 13, 1950 |